Patented Jan. 23, 1945

2,367,805

UNITED STATES PATENT OFFICE 2,367,805

PROCESS FOR POLYMERIZING STYRENE

Robert B. Semple, St. Louis, Mo., assignor to Monsanto Chemical Company, St. Louis, Mo., a corporation of Delaware No Drawing. Application December 19, 1940, Serial No. 370,793

7 Claims. (Cl. 260—91)

This invention relates to an improved process for polymerizing styrene, styrene-containing materials and mixtures of the foregoing materials with other polymerizable materials.

Various means have been employed in the past to accelerate the polymerization of styrene. Thus, heat, actinic light, and certain catalysts and combinations of such means have been suggested for this purpose. While, in general, heat and/or certain catalysts have been most frequently employed in the past, the results obtained by the use of such polymerization methods have not been entirely satisfactory. The use of heat alone has generally required a polymerization of long duration and/or the use of high polymerization temperatures in order to obtain a high percentage conversion of the monomeric styrene to polymeric styrene. The use of effective amounts of such prior catalysts as benzoyl peroxide has tended to cause the polymerized material to discolor and to produce polymers with lower average molecular weights.

It is an object of this invention to provide a new and improved method of polymerizing styrene. Another object of this invention is to provide a new class of catalysts for polymerizing styrene and a polymerization process involving these catalysts. A further object is to provide more effective catalysts for polymerizing styrene.

According to the present invention it has been found that certain organic derivatives of hydrogen peroxide which may be described as hydroperoxides may advantageously be employed as catalysts for the polymerization of styrene and styrene-containing materials. More particularly, the hydroperoxides that fall within the scope of this invention may be represented by the general formula, R—O—O—H, wherein R is the radical R of an alcohol R—OH. By the expression, alcohol, as used hereinafter, it is meant to include broadly, primary, secondary and tertiary alcohols, which compounds may contain one or more hydroxyl groups. Illustrative of a preferred hydroperoxide that can be employed according to this invention to accelerate the polymerization of styrene and styrene-containing materials, is tertiary butyl hydroperoxide, to which may be ascribed the formula, (CH₃)₃C—O—O—H. A method of preparing these materials has been described in United States Patent 2,176,407 to Nicholas A. Milas, dated October 17, 1939, whereby primary, secondary and tertiary alcohols are suitably reacted with hydrogen peroxide.

Included within the scope of this invention is the use of hydroperoxides obtainable by dehydrating a mixture of a primary, secondary or tertiary alcohol, respectively, and aqueous hydrogen peroxide. A list of such alcohols includes, tertiary butyl alcohol, tertiary amyl alcohol, methyl ether of diethylene glycol, ethanol, secondary butyl alcohol, monoethyl ether of ethylene glycol, monomethyl ether of ethylene glycol, diethylene glycol, ethylene glycol, isopropanol, benzyl alcohol, cineol, cyclohexanol, 4-methyl cyclohexanol, tetrahydrofurfuryl alcohol and the like.

Also included within the scope of this invention is the polymerization of mixtures of styrene or styrene-containing materials and one or more other polymerizable materials in the presence of hydroperoxides. More particularly, the polymerization of mixtures of styrene or styrene containing materials and other polymerizable materials which contain at least one group containing the structure represented by

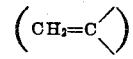

such as the vinyl group (CH₂=CH—) is included within the scope of this invention.

According to the present invention, by using tertiary butyl hydroperoxide, for example, to catalyze the polymerization of styrene, it has been found possible to reduce the polymerization time and/or temperature without substantial impairment of the properties of the polymerized material. Thus, as shown hereinafter in Examples 1 and 2, the use of tertiary butyl hydroperoxide makes possible a more rapid polymerization of styrene, as evidenced by the rate of reduction in methanol-soluble content of the product, without causing an appreciable reduction in the average molecular weight, or impairment of the color of the polymeric material.

Generally it is preferred that the methanol-soluble content of polystyrene be less than substantially 3%. Under prior conditions of polymerization when employing a high purity monomeric styrene, it has generally been necessary either to lengthen considerably the duration of the polymerization, to employ catalysts that produce polystyrene with a lower average molecular weight and poorer color or to treat the product in some relatively expensive manner, such as purification by heating in a vacuum, etc., in order to obtain a polymer with this desired methanol-soluble content. It can be readily seen hereinafter from the examples that the use of tertiary butyl hydroperoxide avoids such difficulties.

The following are specific examples illustrative of the present invention, but not limitative thereof, the parts and percentages being by weight.

In these examples, the percentages of methanol-soluble material in the polymerized styrene were determined in the following manner. A weighed amount of the product was dissolved in sufficient dioxane to produce a solution containing substantially 1.5% of the product. Thereafter, the solution was poured into a large excess of methanol (about 15–20 volumes of methanol per volume of dioxane solution) and the polystyrene was thereby precipitated, leaving in solution any methanol-soluble material such as ethyl benzene and monomeric styrene. The precipitated polystyrene was then separated by filtration and dried to a constant weight at 75 C. and weighed. The weight of the purified polystyrene subtracted from the weight of the material originally dissolved gave the weight of the methanol-soluble material and from this the per cent by weight was calculated.

The average molecular weights of the polymerized materials were determined by employing the well-known Staudinger expression, namely, $MK =$ Specific viscosity/$C$, wherein $M$ is the average molecular weight, $K$ is a constant equal to $1.86 \times 10^4$ for polystyrene, the specific viscosity is the specific viscosity of a very dilute solution of the polymer in dioxane and $C$ is the concentration calculated as mols of monomeric styrene per liter of solution. For further description of this general method of determining average molecular weights the publication "Hochmolekularen Organischen Verbindungen" by Herman Staudinger, published by Julius Springer, Berlin, Germany in 1932, can be consulted.

The tertiary butyl hydroperoxide employed in these examples may be prepared by dehydrating a mixture of aqueous hydrogen peroxide and tertiary butyl alcohol by the process described in United States Patent 2,176,407 referred to above.

Example 1

In this example is shown the polymerization under identical conditions of a series of batches of styrene containing increasing amounts of tertiary butyl hydroperoxide.

|  | Batch No. | | | | |
| --- | --- | --- | --- | --- | --- |
|  | 1 | 2 | 3 | 4 | 5 |
| Styrene...........................parts.. | 30 | 30 | 30 | 30 | 30 |
| Percent tertiary butyl hydroperoxide.......................... | None | 0.001 | 0.005 | 0.01 | 0.05 |

The styrene employed in this example contained substantially 98% monomeric styrene (the balance presumably being ethyl benzene) and was distilled just prior to use. The several batches were each polymerized by heating in sealed glass containers for 6 days at 80° C.

The methanol-soluble contents and the average molecular weights of the products of the above series of polymerizations follow:

|  | Batch No. | | | | |
| --- | --- | --- | --- | --- | --- |
|  | 1 | 2 | 3 | 4 | 5 |
| Percent methanol-soluble material... | 19.3 | 16.7 | 11.9 | 7.7 | 2.8 |
| Average molecular weight........... | 185,000 | 185,000 | 185,000 | 185,000 | 165,000 |

All of these polymeric products possessed equally good color.

Example 2

In this example is shown the polymerization of styrene containing no catalyst and, under identical conditions, the polymerization of batches of styrene containing tertiary butyl hydroperoxide and benzoyl peroxide as catalysts.

|  | Batch No. | | | |
| --- | --- | --- | --- | --- |
|  | 1 | 2 | 3 | 4 |
| Styrene...........................parts.. | 30 | 30 | 30 | 30 |
| Percent tertiary butyl hydroperoxide.......... |  | 0.01 |  |  |
| Percent benzoyl peroxide................. |  |  | 0.01 | 0.1 |

The styrene employed in this example was similar to that employed in Example 1. The several batches were each polymerized by heating in sealed glass containers for 5 days at 100° C.

The methanol-soluble contents of the products of the above series of polymerizations follow:

|  | Batch No. | | | |
| --- | --- | --- | --- | --- |
|  | 1 | 2 | 3 | 4 |
| Percent methanol-soluble material............ | 9.8 | 2.7 | 7.6 | 5.1 |

Example 3

100 parts of styrene similar to that employed in Example 1 were heated in a sealed tin container in the presence of 0.01% of tertiary butyl hydroperoxide for 5 days at 100° C. followed by 6 hours at 175° C. The polymerized product had a methanol-soluble content of 2.8%.

Example 4

100 parts of styrene containing substantially 99.5% monomer were heated in a sealed tin container in the presence of 0.01% of tertiary butyl hydroperoxide for 5 days at 100° C. followed by 6 hours at 175° C. The polymerized product had a methanol-soluble content of 1.5%.

Example 5

100 parts of styrene containing substantially 99% monomer were heated in a tin container in the presence of 0.01% by weight of tertiary butyl hydroperoxide for six days at 100° C. followed by 6 hours at 175° C. The polymerized product had a methanol-soluble content of 1.2%.

As can be seen from the foregoing examples, the hydroperoxides of this invention comprise an effective group of catalysts for styrene and styrene containing materials.

There are numerous variables that may be introduced without departing from the scope of this invention. Thus, this invention is not limited as to the method by which the hydroperoxides are prepared. The polymerization in the presence of these new catalysts is not limited as regards time, temperature, proportion of catalyst, purity of monomeric styrene, etc. Generally, however, it is preferred that the per cent by weight of the hydroperoxide employed should lie between about 0.001% and 0.5% of the weight of the styrene. The styrene-catalyst mixture per se may be polymerized under suitable conditions or it may be polymerized in solution in a suitable solvent or in suspension in or emulsified with a suitable non-solvent.

This invention is limited solely by the claims attached hereto.

What is claimed:

1. A process for polymerizing styrene which comprises heating styrene in the presence of a hydroperoxide.

2. A process for polymerizing styrene which comprises heating styrene in the presence of a substantially dehydrated mixture of aqueous hydrogen peroxide and an alcohol.

3. A process for polymerizing styrene which comprises heating styrene in the presence of tertiary butyl hydroperoxide.

4. A process for polymerizing styrene which comprises heating styrene in the presence of from about 0.001% to about 0.5% by weight of tertiary butyl hydroperoxide.

5. A process which comprises polymerizing styrene in the presence of a compound having the general formula, R—O—O—H, wherein R is the radical R of an aliphatic alcohol R—OH.

6. A process for polymerizing styrene which comprises heating a mixture comprising mostly styrene in the presence of a substantially dehydrated mixture of aqueous hydrogen peroxide and an aliphatic alcohol.

7. A process for polymerizing styrene to form a polymer containing at least 97% polystyrene which comprises heating styrene in the presence of a compound having the general formula R—O—O—H, wherein "R" is the radical R of an alcohol R—OH.

ROBERT B. SEMPLE.